United States Patent Office 3,558,533
Patented Jan. 26, 1971

3,558,533
VINYL COMPOSITION AND METHOD
OF MAKING SAME
Leo Feit, 49 Daventry Court, Killarney,
Johannesburg, Republic of South Africa
No Drawing. Filed Feb. 10, 1969, Ser. No. 798,112
Int. Cl. C08f 47/10; C08v 1/20
U.S. Cl. 260—2.5                                    9 Claims

ABSTRACT OF THE DISCLOSURE

Vinyl compositions having anti-slip properties, resistance to exudation of plasticizer and high capacity for fillers, pigments and other dry components, comprise (a) 100 parts by weight of vinyl polymer or copolymer; (b) 40 to 180 parts by weight of plasticizers including 1½ to 15 parts by weight of epoxidized oil polyester of a molecular weight of 600 to 1000 and not less than 20 parts by weight of an ester such as butyl benzyl phthalate; (c) ½ to 5 parts by weight of a mixture of 20–80% by weight of a higher fatty acid ester having 15–19 carbon atoms in the fatty acid chain with the balance para-coumarone-indene resin, petroleum resin, and/or ethylcellulose; and (d) one to 180 parts by weight of fillers, pigments, etc.

---

This invention relates to improved vinyl compositions for use in the manufacture of flexible articles having anti-slip properties, high resistance to exudation of plasticizer, a high rate of recovery from compressive stress and which can be made either in cellular or non-cellular form.

The present methods of preparing vinyl compositions for use in the manufacture of flexible vinyl articles consist in mixing vinyl resins with suitable plasticizer, adding, when used, fillers, pigments, coloring matter and lubricant, and a blowing agent for achieving a cellular composition, and homogenizing the composition by passing the mixture through a three-roll paint mill, a Banbury mixer or a two-roll mixing calender.

The amount of plasticizer that can be employed is limited because it is necessary to minimize the exudation of plasticizer from gelled articles manufactured from the composition, which occurs if the amount of plasticizer used is too high. The usual amount of plasticizer employed ranges from 50 to 65 parts by weight per hundred parts by weight of the resin. The amount of fillers, pigments, or other dry components which can be incorporated in the resin and plasticizer mixture is also limited because it is necessary to maintain good fluidity of the composition, and is usually in the range of from 15 to 36 parts by weight per 100 parts by weight of the resin, depending on the oil absorption value of the dry components.

Articles manufactured from such vinyl compositions have the characteristic slip tendency of vinyl products and, as with vinyl material in general, are subject to deformation by compressive stress with limited recovery due to the elastoplastic behavior of vinyl material under stress.

It is an object of the present invention to provide vinyl compositions which impart anti-slip properties to articles manufactured from such compositions and which have a high rate of recovery from compressive stress upon removal of the stress.

Another object of the present invention is to provide compositions which will impart high resistance to plasticizer exudation to articles manufactured from such compositions, even when unusually large amounts of plasticizer relative to the resin are used.

A further object of the present invention is to provide compositions of improved binding capacity, so that unusually large amounts of fillers, pigments and other dry components may normally be incorporated in the resin-plasticizer mixture.

According to the present invention there is provided a composition comprising vinyl chloride homopolymer or copolymer containing less than 40% by weight of a comonomer which is vinyl acetate and/or vinylidene chloride or a mixture of homopolymer with such a copolymer, and 40 to 180 parts by weight of plasticizer and, when used, 1 to 180 parts by weight of fillers, pigments, heat stabilizers, coloring matter, lubricant and, for achieving a cellular composition, a blowing agent, which is modified by ½ to 5 parts by weight of a mixture consisting of not less than 20% and not more than 80% by weight of the mixture of a dihydric or polyhydric or polyethoxy dihydric alcohol higher fatty acid ester having 15–19 carbon atoms in the fatty acid chain, the balance being para-coumarone-indene resin, petroleum resin, and/or ethylcellulose, the ratio depending on the desired melting point of the compound, liquified in 1½ to 15 parts by weight of epoxidized oil polyester of a molecular weight of 600 to 1,000 in the presence of at least 20 parts by weight of phthalic acid derivative esters, phosphoric acid derivative esters or benzoic acid derivative esters or mixtures of such esters, the parts by weight being per hundred parts by weight of the resin contained in the composition.

The dihydric alcohol higher fatty acid ester is preferably an ester of ethylene glycol and stearic acid. The polyhydric alcohol higher fatty acid ester is preferably an ester of diethylene glycol, triethylene glycol, propylene glycol or octylene glycol and stearic acid. The polyethoxy dihydric alcohol higher fatty acid ester is preferably an ester of polyethylene glycol of a molecular weight of 600 to 7,500 and stearic acid.

The para-coumarone-indene resin is preferably a resin having a melting point of 100 to 215° C. The petroleum resin is preferably a resin having a melting point of 100 to 150° C. The ethylcellulose is a cellulose ether having preferably an ethoxyl content of 46.8 to 50% and a flow point of 150 to 210° C.

For purpose of the present invention, the following esters being members of the group of phthalic acid derivatives, or the group of phosphoric acid derivatives or the group of benzoic acid derivatives are preferred: butyl benzyl phthalate, butyl nonyl phthalate, butyl octyl phthalate, dipropylene glycol dibenzoate, diethylene glycol dibenzoate, dibutyl phthalate, mixed alkyl phthalate consisting of ⅓ to ⅔ diisodecyl phthalate the balance being butyl benzyl phthalate, tributoxy ethyl phosphate, tricresyl phosphate, octyl diphenyl phosphate, cresyl diphenyl phosphate, butyl isodecyl phthalate, butyl cyclohexyl phthalate, trioctyl phosphate and dibutoxy ethyl phthalate or mixtures of the said esters.

It has been found that, when ½ to 5 parts by weight of a mixture consisting of not less than 20% and not more than 80% by weight of the mixture, of dihydric or polyhydric or polyethoxy dihydric alcohol higher fatty acid ester the balance being para-coumarone-indene resin, petroleum resin and/or ethylcellulose the ratio depending on the desired melting point of the mixture, is liquified in 1½ to 15 parts by weight of epoxidized oil polyester of a molecular weight of 600 to 1,000 in the presence of at least 20 parts by weight of butyl benzyl phthalate or the other esters mentioned above or mixtures of such esters but preferably butyl benzyl phthalate, a modification of the mixture results. In the invented vinyl composition, the product of the modification has the capacity to render other admixed plasticizers mentioned below stable, thus preventing or minimizing exudation of plasticizer from the gelled composition. Plasticizers suitable for admixture are: esters of aliphatic alcohol and aromatic acid, esters of aromatic alcohol and aliphatic acid, esters of aromatic alcohol and aromatic acid, esters of inorganic acid, aromatic hydrocarbon condensates, hydrocarbon diluents, including chlorinated paraffin and hydrogenated terphenyl.

It has further been found that the product of the modification contributes additional adhesive properties to the resinous composition improving the binding efficiency, so that substantial amounts of fillers and pigments can be incorporated in the composition of the invention.

The mixture of higher fatty acid ester, para-coumarone-indene resin, petroleum resin, and/or ethylcellulose, can be premixed with the epoxidized oil polyester and the butyl benzyl phthalate or the other esters mentioned above or mixtures of said esters, and heated to a temperature above the melting point of the mixture, bringing about modification of the mixture and then added to the other components of the composition during mixing of the same. This can, however, be obviated when the composition is prepared in the following manner and sequence: All the formulated fluid components such as the plasticizers including the epoxidized oil polyester and the butyl benzyl phthalate or the other esters mentioned above or mixtures of the said esters are mixed together, and with this mixture the resin and the powdered mixture of higher fatty acid ester, para-coumarone-indene resin, petroleum resin and/or ethylcellulose is admixed, followed by the other formulated dry ingredients. The whole is then homogenized. When the composition of the invention is used in the manufacture of vinyl articles, it is as is well known to those versed in the art, gelled at a temperature of from 150 to 210° C., a temperature in excess of the melting point of the mixture of higher fatty acid ester, para-coumarone-indene resin, petroleum resin and/or ethylcellulose. The mixture thus automatically liquifies in the epoxidized oil polyester and the butyl benzyl phthalate or the other esters mentioned above or mixtures of the said esters, which are present in the composition, resulting in modification according to the invention.

When the composition is to be cellular, an azodiformamide or another like blowing agent in powder form is admixed together with any other dry component used in preparing the composition. The blowing agent requires a temperature of from 160 to 210° C. to react. At the gelling temperature mentioned above the blowing agent decomposes, bringing about the expansion of the composition.

This method of preparing the composition lends itself to most uses to which the composition is to be put.

The method employed in the manufacture of articles from the invented compositions determines the manner of mixing and homogenizing of the composition. Mixing and homogenizing of the composition can be effected at room temperature or under heat and pressure, or mixing at room temperature and homogenizing under heat and pressure can be employed, as required.

From the examples illustrating the invented composition it will become apparent, that the ratio of mixture consisting of higher fatty acid ester, para-coumarone-indene resin, petroleum resin and/or ethylcellulose to epoxidized oil polyester and butyl benzyl phthalate or the other esters mentioned above or mixtures of the esters is not fixed, but can vary within the limits of 5 parts of mixture by weight of the resin to 15 parts of epoxidized oil polyester by weight of the resin and that the minimum of butyl benzyl phthalate or the other esters mentioned above or mixtures of such esters is 20 parts by weight of the resin.

It will also become apparent, that the ratio of higher fatty acid ester in the mixture to the other components of the mixture is not fixed, but can vary within the limits of 20% minimum and 80% maximum by weight of mixture. It will further become apparent, that the ratio of para-coumarone-indene resin, or petroleum resin in the mixture of ethylcellulose when used together, is not fixed.

The ratios are governed by the desired melting point of the mixture, and the ratio of the compound to the polyester and butyl benzyl phthalate or the other esters or mixtures of the esters mentioned above is governed by the properties desired in the articles manufactured from the invented composition.

The following examples, in which all parts are parts by weight, illustrate the present invention:

EXAMPLE 1

100 parts of polyvinyl chloride
100 parts of butyl benzyl phthalate
5 parts of Paraplex G 62 (an epoxidized oil polyester of a molecular weight of 990 made by and commercially available from Rohm & Haas, Philadelphia, Pa.)
20 parts of dioctyl phthalate
10 parts of titanium dioxide rutile
10 parts of dry white lead
2 parts of a mixture consisting of 25% of ethylene glycol mono-stearate, 40% para-coumarone-indene resin, 35% ethylcellulose by weight, having a melting point of 130/131° C.
100 parts of calcium carbonate
7 parts of chromium oxide

EXAMPLE 2

The components of this formulation are the same as in Example 1 except that polyethylene 6000 mono-stearate replaces ethylene glycol mono-stearate. The melting point is unchanged.

EXAMPLE 3

The components of this formulation are the same as in Example 1 except that diethylene glycol stearate replaces ethylene glycol mono-stearate. The melting point is 125/128° C.

EXAMPLE 4

The components of this formulation are the same as in Example 1 except that the "mixture" consists of 40% of ethylene glycol mono-stearate and 60% of para-coumarone-indene resin. Melting point of the "mixture" is 120° C.

EXAMPLE 5

The components of this formulation are the same as in Example 1 except that the "mixture" consists of 40% of polyethylene glycol 6000 mono-stearate and 60% of ethylcellulose. Melting point of the "mixture" is 120/130° C.

EXAMPLE 6

The components of this formulation are the same as in Example 1 except that 3 parts of Celogen AZ (a blowing agent made by and commercially available from Naugatuck Chemical Div. of U.S. Rubber Company, Naugatuck, Conn.) were also used.

EXAMPLE 7

100 parts of vinyl chloride copolymerized with less than 40% vinyl acetate
20 parts of butyl nonyl phthalate
5 parts of Paraplex G 62
5 parts of trioctyl phosphate
5 parts of chlorinated paraffin
25 parts of diisooctyl phthalate
2 parts of a mixture consisting of 20% ethylene glycol mono-stearate, 50% para-coumarone-indene resin, 30% ethylcellulose by weight, having a melting point of 140/142° C.
10 parts of titanium dioxide rutile
5 parts of dibasic lead phosphite
5 parts of chromium oxide

EXAMPLE 8

The components of this formulation are the same as in Example 7 except that 7½ parts of epoxidized oil polyester Paraplex G 62 were used.

EXAMPLE 9

The components of this formulation are the same as in Example 7 except that the resin used was a copolymer of vinyl chloride with vinylidene chloride containing less than 40% of the latter.

EXAMPLE 10

The components of this formulation are the same as in Example 7 except that the resin used was a mixture of vinyl chloride homopolymer and a copolymer of vinyl chloride with vinyl acetate.

EXAMPLE 11

The components of this formulation are the same as in Example 7 except that 3 parts of Celogen AZ blowing agent were also used.

EXAMPLE 12

The components of this formulation are the same as in Example 7 except that the "mixture" consists of 20% ethylene glycol mono-stearate, 50% petroleum resin, 30% ethylcellulose by weight, having a melting point of 130/135° C.

The para-coumarone-indene resin in the mixture of the examples had a melting point of 150/160° C. The petroleum resin had a melting point of 130° C. The ethylcellulose had a flow point of 160° C. The ethylene glycol mono-stearate had a melting point of 57/60° C. The diethylene glycol stearate had a melting point of 47/56° C. The polyethylene glycol 6000 mono-stearate had a melting point of 58/60° C.

Having described my invention, I claim:

1. A resin composition consisting essentially of (a) 100 parts by weight of a member selected from the group consisting of (1) vinyl chloride homopolymer, (2) copolymer of vinyl chloride and up to 40% by weight of a member selected from the group consisting of vinyl acetate, vinylidene chloride and mixtures thereof, and (3) mixtures of said homopolymer and said copolymer; (b) 40 to 180 parts by weight of plasticizer including 1½ to 15 parts by weight of epoxidized oil polyester of a molecular weight of 600 to 1,000 and not less than 20 parts by weight of a member selected from the group consisting of phthalic acid derivative esters, phosphoric acid derivative esters, benzoic acid derivative esters, and mixtures thereof; (c) ½ to 5 parts by weight of a mixture of 20 to 80% by weight of a member selected from the group consisting of dihydric, polyhydric and polyethoxy dihydric alcohol higher fatty acid ester having 15 to 19 carbon atoms in the fatty acid chain, balance essentially a member selected from the group consisting of para-coumarone-indene resin, petroleum resin, ethylcellulose, and mixtures thereof; and (d) 1 to 180 parts by weight of at least one member selected from the group consisting of fillers, pigments, heat stabilizers, coloring matter, lubricant and blowing agent.

2. A resin composition according to claim 1, in which the phthalic acid derivative esters consist of butyl benzyl phthalate, butyl nonyl phthalate, butyl octyl phthalate, dibutyl phthalate, mixed alkyl phthalate consisting of ⅓ to ⅔ diisodecyl phthalate the balance being butyl benzyl phthalate, butyl isodecyl phthalate, butyl cyclohexyl phthalate, and dibutoxy ethyl phthalate.

3. A resin composition according to claim 1, in which the phosphoric acid derivative esters consist of tributoxy ethyl phosphate, tricresyl phosphate, octyl diphenyl phosphate, cresyl diphenyl phosphate, and trioctyl phosphate.

4. A resin composition according to claim 1 in which the benzoic acid derivative esters consist of dipropylene glycol dibenzoate and diethylene glycol dibenzoate.

5. A resin composition according to claim 1 in which said balance comprises para-coumarone-indene resin having a melting point of 100 to 215° C.

6. A resin composition according to claim 1 in which said balance comprises petroleum resin having a melting point of 100 to 150° C.

7. A resin composition according to claim 1, in which said balance comprises ethylcellulose having an ethoxyl content of 46.8 to 50%.

8. A method of preparing a resin composition according to claim 1 in which 100 parts by weight of a member selected from the group consisting of (1) vinyl chloride homopolymer, (2) copolymer of vinyl chloride and a member selected from the group consisting of vinyl acetate, vinylidene chloride and mixtures thereof, and (3) mixtures of said homopolymer and said copolymer is admixed with 1½ to 15 parts by weight of epoxidized oil polyester of a molecular weight of 600 to 1,000, ½ to 5 parts by weight of a mixture of 20 to 80% by weight of higher fatty acid ester of dihydric, polyhydric and polyethoxy dihydric alcohol, the fatty acid having 15 to 19 carbon atoms in the fatty acid chain, balance essentially a member of the group consisting of para-coumarone-indene resin, petroleum resin, ethylcellulose and mixtures thereof, in the presence of not less than 20 parts by weight of a member selected from the group consisting of phthalic acid derivative esters, phosphoric acid derivative esters, benzoic acid derivative esters and mixtures thereof.

9. A method according to claim 8 in which the material which is admixed with said 100 parts is heated to a temperature above its melting point.

References Cited

UNITED STATES PATENTS

| | | | |
|---|---|---|---|
| 3,076,234 | 2/1963 | Paulus | 260—2.5 |
| 3,290,265 | 12/1966 | Kaneko | 260—17 |
| 3,318,825 | 5/1967 | Enk et al. | 260—17 |
| 3,383,345 | 5/1968 | Bauer | 260—22EP |
| 3,389,013 | 6/1968 | Armitage et al. | 260—22EP |

SAMUEL H. BLECH, Primary Examiner

M. FOELAK, Assistant Examiner

U.S. Cl. X.R.

260—17, 22, 30.4, 30.6, 31.2, 31.8, 829, 899